(12) United States Patent
Nakata

(10) Patent No.: US 11,526,708 B2
(45) Date of Patent: Dec. 13, 2022

(54) INFORMATION PROCESSING DEVICE, INFORMATION PROCESSING METHOD, AND RECORDING MEDIUM

(71) Applicant: Panasonic Intellectual Property Corporation of America, Torrance, CA (US)

(72) Inventor: Yohei Nakata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 381 days.

(21) Appl. No.: 16/859,264

(22) Filed: Apr. 27, 2020

(65) Prior Publication Data

US 2020/0364517 A1 Nov. 19, 2020

Related U.S. Application Data

(63) Continuation of application No. PCT/JP2019/031587, filed on Aug. 9, 2019.
(Continued)

(30) Foreign Application Priority Data

May 15, 2019 (JP) .............................. JP2019-092489

(51) Int. Cl.
*G06V 10/764* (2022.01)
*G06K 9/62* (2022.01)
(Continued)

(52) U.S. Cl.
CPC ........... *G06K 9/6277* (2013.01); *G06K 9/628* (2013.01); *G06K 9/6256* (2013.01); *G06N 20/00* (2019.01);
(Continued)

(58) Field of Classification Search
CPC .. G06K 9/6256; G06K 9/6273; G06K 9/6277; G06K 9/628; G06T 7/00;
(Continued)

(56) References Cited

U.S. PATENT DOCUMENTS 9,235,781 B2 * 1/2016 Poole ...................... G06K 9/628
10,657,364 B2 * 5/2020 El-Khamy ............... G06N 3/08
(Continued)

FOREIGN PATENT DOCUMENTS

JP 2016-151805 8/2016

OTHER PUBLICATIONS

International Search Report dated Oct. 21, 2019 in International (PCT) Application No. PCT/JP2019/031587.
(Continued)

*Primary Examiner* — Ian L Lemieux
(74) *Attorney, Agent, or Firm* — Wenderoth, Lind & Ponack, LLP

(57) ABSTRACT

An information processing device includes a processor. The processor obtains an input image, inputs the input image to a machine learning model that executes classification likelihood calculation processing to obtain, for each of candidate objects in the input image, likelihoods of belonging to the plurality of classes, executes first determination on whether or not each of the candidate objects is classified as a first class of the plurality of classes using a likelihood of belonging to the first class that is a likelihood having a negative correlation with likelihoods of belonging to other classes, executes second determination on whether or not each of the candidate objects that have been determined in the first determination as a non-first class is classified as the other classes, and outputting a result of classifying the candidate objects included in the input image using a result of the second determination.

8 Claims, 9 Drawing Sheets

Related U.S. Application Data

(60) Provisional application No. 62/747,276, filed on Oct. 18, 2018.

(51) Int. Cl.
   *G06N 20/00* (2019.01)
   *G06V 10/82* (2022.01)
   *G06V 10/70* (2022.01)
   *G06V 10/84* (2022.01)
   *G06V 10/774* (2022.01)

(52) U.S. Cl.
   CPC ............ *G06V 10/764* (2022.01); *G06V 10/82* (2022.01); *G06V 10/70* (2022.01); *G06V 10/774* (2022.01); *G06V 10/84* (2022.01)

(58) Field of Classification Search
   CPC ...... G06N 20/00; G06N 3/0454; G06V 10/70; G06V 10/764; G06V 10/774; G06V 10/82; G06V 10/84; G06V 10/58
   See application file for complete search history.

(56) References Cited

U.S. PATENT DOCUMENTS

| | | | | |
|---|---|---|---|---|
| 2007/0055153 | A1* | 3/2007 | Simopoulos | G16H 30/40 600/437 |
| 2011/0052063 | A1* | 3/2011 | McAuley | G06K 9/6219 382/224 |
| 2017/0046596 | A1* | 2/2017 | Bobbitt | H04N 7/181 |
| 2018/0268292 | A1* | 9/2018 | Choi | G06V 10/454 |
| 2018/0285692 | A1* | 10/2018 | Xiao | G06T 7/70 |
| 2018/0314911 | A1* | 11/2018 | Eldar | G06V 20/64 |
| 2019/0287235 | A1* | 9/2019 | Ikeda | G06T 7/62 |
| 2021/0365707 | A1* | 11/2021 | Mao | G06K 9/627 |

OTHER PUBLICATIONS

Wei Liu et al, "SSD: Single Shot Multibox Detector", arXiv:1512.02325v5[cs.CV], Dec. 29, 2016, pp. 1-17.

Extended European Search Report dated Nov. 5, 2021 in corresponding European Patent Application No. 19872900.6.

Wang, Jingyan et al., "The More You Look, the More You See: Towards General Object Understanding Through Recursive Refinement", 2018 IEEE Winter Conference On Applications of Computer Vision (WACV), Mar. 12, 2018, pp. 1794-1803, XP033337804.

\* cited by examiner

INFORMATION PROCESSING DEVICE, INFORMATION PROCESSING METHOD, AND RECORDING MEDIUM

CROSS REFERENCE TO RELATED APPLICATIONS

This application is a U.S. continuation application of PCT International Patent Application Number PCT/JP2019/031587 filed on Aug. 9, 2019, claiming the benefit of priority of U.S. Provisional Patent Application No. 62/747,276 filed on Oct. 18, 2018 and Japanese Patent Application Number 2019-092489 filed on May 15, 2019, the entire contents of which are hereby incorporated by reference.

BACKGROUND

1. Technical Field

The present disclosure relates to an information processing device, an information processing method, and a recording medium.

2. Description of the Related Art

In recent years, there has been an increasing demand for a device for and a method of efficiently detecting an object in an image.

For example, Japanese Unexamined Patent Application Publication No. 2016-151805 discloses a detection device including a plurality of one-class classifiers and a multiclass classifier and a detection method. The one-class classifiers determine the presence/absence of an object in a target image. If any one of the one-class classifiers determines that there is an object, the multiclass classifier classifies the target image into other one-class classifiers.

For example, Wei Liu et al., SSD: SINGLE SHOT MULTIBOX DETECTOR, arXiv:1512.02324v5 [cs.CV], 29 Dec. 2016 discloses a method of inputting a target image, and executing search and classification of candidate bounding boxes of all candidate objects into classes through convolution filter processing.

SUMMARY

The background art may increase, however, the amount of processing for classifying objects into classes. For example, the background art according to Japanese Unexamined Patent Application Publication No. 2016-151805 executes classification processing a plurality of times, which increases the amount of processing and the time. On the other hand, the background art according to Wei Liu et al., SSD: SINGLE SHOT MULTIBOX DETECTOR, arXiv:1512.02324v5 [cs.CV], 29 Dec. 2016 performs non-maximum suppression (NMS) processing of all detected candidate bounding boxes. With an increase in the number of the candidate bounding boxes, the amount of processing also increases.

To address the problems, the present disclosure provides an information processing device, an information processing method, and a recording medium capable of reducing the amount of processing for classifying objects into classes.

In order to achieve the objective, an information processing device according to an aspect of the present disclosure includes a processor. The processor: obtains an input image; inputs the input image to a machine learning model that executes classification likelihood calculation processing to obtain, for each of candidate objects in the input image, likelihoods of belonging to a plurality of classes; executes first determination on whether or not each of the candidate objects is classified as a first class of the plurality of classes using a likelihood of belonging to the first class that is a likelihood having a negative correlation with likelihoods of belonging to other classes; executes second determination on whether or not each of the candidate objects that have been determined in the first determination as a non-first class is classified as the other classes; and outputs a result of classifying the candidate objects included in the input image using a result of the second determination.

An information processing method according to an aspect of the present disclosure is executed by a processor. The information processing method includes: obtaining an input image; inputting the input image to a machine learning model that executes classification likelihood calculation processing to obtain, for each of candidate objects in the input image, likelihoods of belonging to a plurality of classes; executing first determination on whether or not each of the candidate objects is classified as a first class of the plurality of classes using a likelihood of belonging to the first class that is a likelihood having a negative correlation with likelihoods of belonging to other classes; executing second determination on whether or not each of the candidate objects that have been determined in the first determination as a non-first class is classified as the other classes; and outputting a result of classifying the candidate objects included in the input image using a result of the second determination.

An aspect of the present disclosure may be implemented by a program for causing a computer to execute the information processing method.

Alternatively, an aspect of the present disclosure may be implemented by a non-transitory computer-readable recording medium that stores the program.

The present disclosure reduces the amount of processing for classifying an object into classes.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
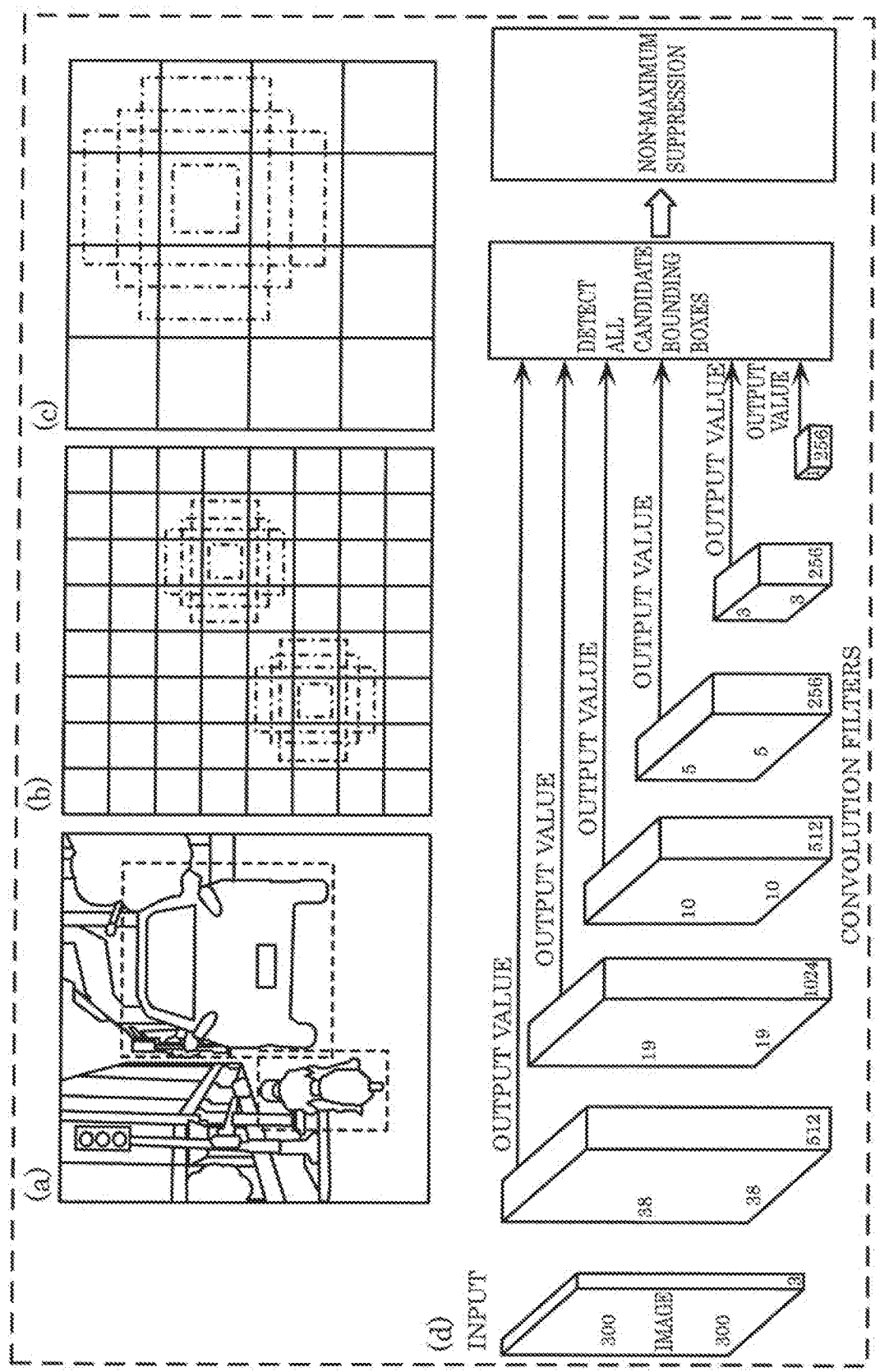
FIG. 1 illustrates an example object detection algorithm.

Underlying Knowledge Forming Basis of the Present Disclosure Now, an object detection method according to the background art will be described. FIG. 1 illustrates an example object detection method. The object detection method employs, for example, a single shot detector (SSD) as a convolutional neural network (CNN) (see, e.g., Wei Liu et al., SSD: SINGLE SHOT MULTIBOX DETECTOR, arXiv:1512.02324v5 [cs.CV], 29 Dec. 2016). In FIG. 1, (a) shows an example input image to an CNN. In (a) of FIG. 1, object regions are surrounded by the broken lines. The object regions include captured objects. In FIG. 1, (b) shows an 8×8 feature map obtained by inputting the input image to the CNN. In FIG. 1, (c) shows a 4×4 feature map. In (b) and (c) of FIG. 1, the regions surrounded by the one-dot chain lines are candidate bounding boxes. In FIG. 1, (d) shows an example CNN.

In the object detection method shown in FIG. 1, the input image shown in (a) is input to the CNN. The input image is convoluted by the CNN including various types of convolution filters, and converted into feature maps in various sizes. As shown in (b) and (c) of FIG. 1, a plurality of candidate bounding boxes (four candidate bounding boxes here) are then assigned to pixels on each feature map. All the candidate bounding boxes on the feature map (hereinafter simply referred to as "all the candidate bounding boxes") are detected, and at the end, search for the maximum value (e.g., NMS processing) is executed. Accordingly, a result of detecting objects in an input image is output. As shown in (d) of FIG. 1, the feature map obtained in convolution filter processing is input to another convolution filter for convolution, which is repeated in the SSD. In this manner, a feature map is convoluted into smaller sizes little by little using a plurality of various convolution filters, which allows detection of candidate bounding boxes in various scales regardless of the magnitude of the feature. Note that output values in the figure are data on the association between category scores (e.g., likelihoods of belonging to classes) and offsets between the positions (e.g., four-dimensional parameters of the x-coordinates of the centers, the y-coordinates of the centers, the widths, and the heights) of an object region and a default box.

Figure 2:
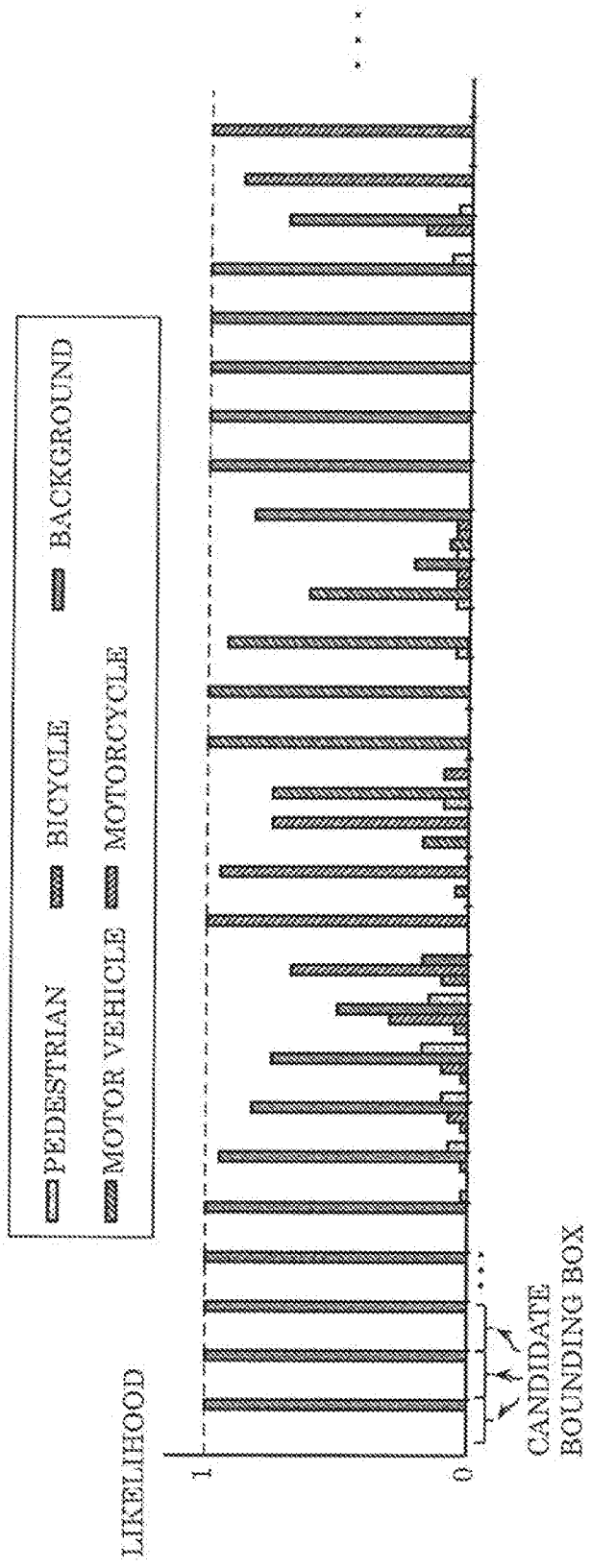
FIG. 2 shows an example result of calculating the likelihoods of candidate bounding boxes belonging to each class.

FIG. 2 shows example output values from the feature maps described with reference to FIG. 1. An example will be described using the two object regions in the input image shown in (a) of FIG. 1. The two object regions in the input image correspond to two sets of candidate bounding boxes on the 8×8 feature map shown in (b) of FIG. 1. The set of candidate bounding boxes on the 4×4 feature map shown in (c) of FIG. 1 and in FIG. 2 corresponds to the object region of the motor vehicle shown in (a) of FIG. 1. FIG. 2 shows calculated likelihoods of the candidate bounding boxes belonging to five classes of: pedestrian, motor vehicle, bicycle, motorcycle, and background. As shown in FIG. 2, the likelihoods of all the candidate bounding boxes belonging to the classes are calculated in detection processing of all candidate bounding boxes. Data is obtained on the association between the category scores and the offsets between the shapes of the candidate bounding boxes. While the normalized likelihoods are used in the example shown in FIG. 2, unnormalized likelihoods may also be used.

Figure 3:
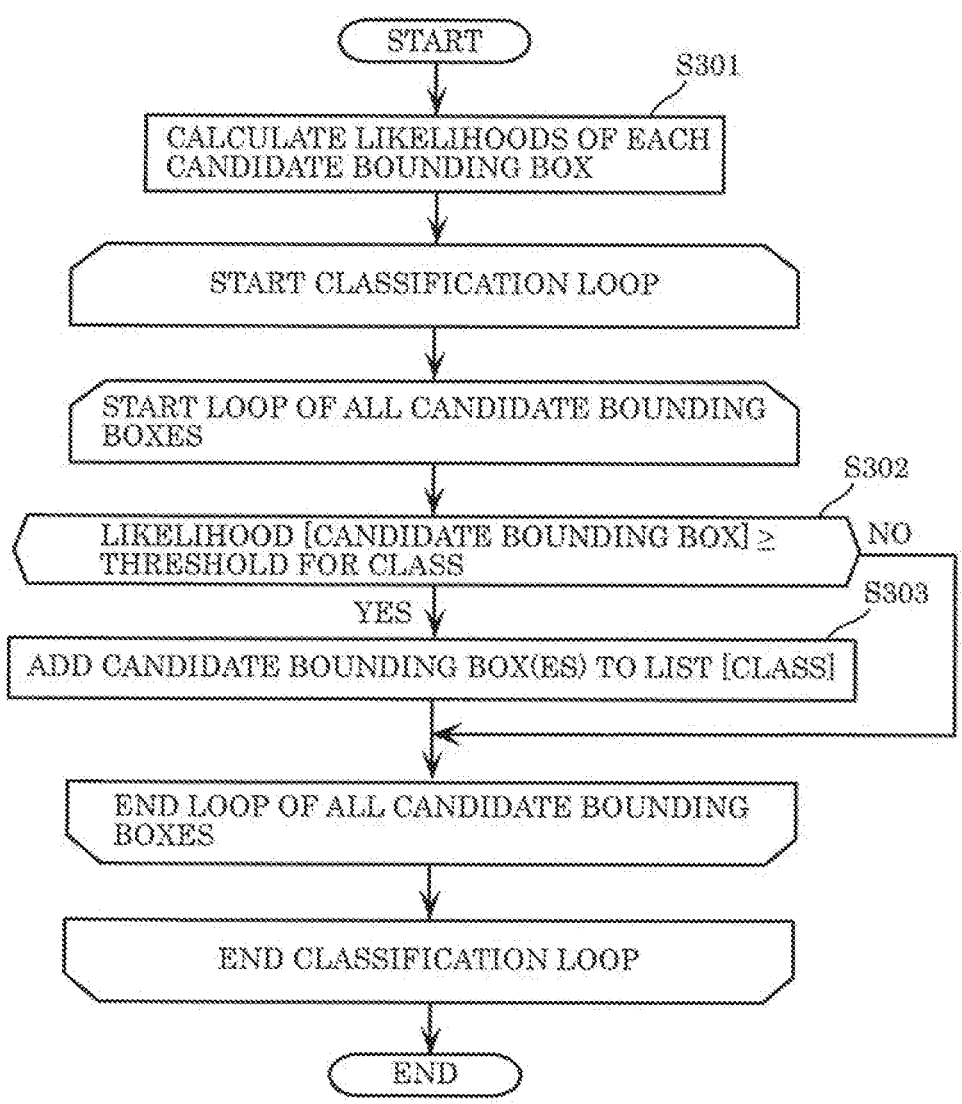
FIG. 3 is a flow chart for illustrating an object detection method according to background art.

Now, the NMS processing will be described. The NMS processing includes first processing and second processing. The first processing is classification processing of classifying all the candidate bounding boxes detected in the processing flow described above into the classes. In the second processing, the overlapping ones of all the classified candidate bounding boxes are integrated into a single candidate bounding box. FIG. 3 is a flow chart showing example classification processing according to the background art. In FIG. 3, step S301 represents the detection processing of all the candidate bounding boxes. In the processing of step S301, the likelihoods of the candidate bounding boxes in the input image belonging to the plurality of classes are calculated. As shown in FIG. 3, in the background art, the processing of a classification loop of all the candidate bounding boxes is executed after the processing of step S301. All the candidates include, as shown in FIG. 2, the candidate bounding boxes for the background including no detection target object. The background art also executes the classification processing of the candidate bounding boxes for the background. For example, whether or not the likelihood of a certain candidate bounding box belonging to the motor vehicle class (likelihood [object in candidate bounding box]) is higher than or equal to the threshold for the "motor vehicle" (threshold [motor vehicle]) is determined (step S302). If the likelihood of the certain candidate bounding box belonging to the "motor vehicle" is higher than or equal to the threshold for the "motor vehicle" (Yes in step S302), the certain candidate bounding box is added to the list of the motor vehicle class (list [motor vehicle]) (step S303). On the other hand, if the likelihood of the certain candidate bounding box belonging to the "motor vehicle" is lower than the threshold for the "motor vehicle" (No in step S302), the certain candidate bounding box is not added to the list of the motor vehicle class.

Next, whether or not the likelihood of another candidate bounding box belonging to the motor vehicle class is higher than or equal to the threshold for the "motor vehicle" is determined (step S302). If the likelihood of this candidate bounding box belonging to the "motor vehicle" is higher than or equal to the threshold for the "motor vehicle" (Yes in step S302), this candidate bounding box is added to the list of the motor vehicle class (step S303). On the other hand, if the likelihood of this candidate bounding box belonging to the "motor vehicle" is lower than the threshold for the "motor vehicle" (No in step S302), this candidate bounding box is not added to the list of the motor vehicle class.

In this manner, the classification processing is executed to determine whether or not all the candidate bounding boxes are classified as the motor vehicle class. After the end of the classification processing, classification processing of is executed to determine whether or not all the candidate bounding boxes are classified as a class (e.g., a pedestrian class) other than the motor vehicle class. After the end of the classification processing (i.e., the first processing) of all the candidate bounding boxes to determine whether or not the candidate bounding boxes are classified as the classes, the second processing of all the candidate bounding boxes is executed.

In the second processing, assume that one of all the detected candidate bounding boxes overlaps a candidate bounding box detected with a higher likelihood than the one of the candidate bounding boxes. If the degree of overlap between these candidate bounding boxes is higher than a predetermined threshold, the one of the candidate bounding boxes is deleted. That is, the one(s) of the overlapping candidate bounding boxes other than the one with a maximum likelihood is deleted to integrate the candidate bounding boxes into the one.

As described above, the object detection method according to the background art executes the NMS processing of all the candidate bounding boxes. This causes a large amount of determination processing at the final stage. In addition, the NMS processing has difficulty in increasing the speed using a dedicated processor unlike convolutional calculation processing and is thus often executed by a central processing unit (CPU). The object detection device is often mounted in an in-vehicle network. The CPU mounted in an in-vehicle network has lower processing capabilities and thus takes a longer time for the NMS processing than a CPU mounted in a computer.

As a result of diligent studies in view of the problems, the present inventor found that the amount of processing is reduced as follows. Candidate bounding box highly likely to include a detection target object are extracted from all detected candidate bounding boxes based on the likelihood of belonging to a class (e.g., background), the likelihood having a negative correlation with the likelihoods of belonging to other classes. For example, the present inventor found that the amount of the second processing is reduced as follows. Candidate bounding boxes are classified into the background class and the non-background class. Only the candidate bounding boxes classified as the non-background class, that is, the candidate bounding boxes highly likely to include a detection target object are subjected to determination processing on whether or not the candidate bounding boxes are classified as the other classes. Accordingly, the inventor conceived of an information processing device and an information processing method capable of reducing the amount of determination processing at the final stage.

The outline of an aspect of the present disclosure is as follows.

An information processing device according to an aspect of the present disclosure includes a processor. The processor: obtains an input image; inputs the input image to a machine learning model that executes classification likelihood calculation processing to obtain, for each of candidate objects in the input image, likelihoods of belonging to a plurality of classes; executes first determination on whether or not each of the candidate objects is classified as a first class of the plurality of classes using a likelihood of belonging to the first class that is a likelihood having a negative correlation with likelihoods of belonging to other classes; executes second determination on whether or not each of the candidate objects that have been determined in the first determination as a non-first class is classified as the other classes; and outputs a result of classifying the candidate objects included in the input image using a result of the second determination.

In this manner, the first determination on each of the candidate objects is executed using the likelihood of belonging to the first class, the likelihood having the negative correlation with the likelihoods of belonging to the other classes. The candidate bounding boxes are accurately classified into the first class or the non-first class. Only the candidate objects determined as the non-first class are subjected to the second determination on whether or not these candidate objects are classified as the classes other than the first class. Accordingly, the information processing device according to the aspect of the present disclosure reduces the amount of processing for classifying objects into classes.

For example, the processor determines, in the first determination, whether or not the likelihood of each of the candidate objects belonging to the first class may be higher than or equal to a first threshold. The processor: may further execute third determination on whether or not the candidate objects are classified as the other classes; and determine, as the first threshold, a value greater than a likelihood of each of the candidate objects that have been determined in the third determination as the other classes, belonging to the first class. The processor may: execute the third determination on candidate objects in a plurality of input images; and determine, as the first threshold, a value greater than all likelihoods of the candidate objects in the plurality of input images that have been determined in the third determination as the other classes, belonging to the first class.

With this configuration, the first determination is performed based on the first threshold. The candidate objects determined as the non-first class in the first determination includes all the candidate objects classified as the classes other than the first class. Accordingly, the information processing device according to the aspect of the present disclosure executes the first determination, thereby accurately classifying all the candidate objects in the input image into the first class or the non-first class.

For example, the first class may be a background class.

With this configuration, the information processing device according to the aspect of the present disclosure executes determination processing on whether or not the candidate objects highly likely to include a detection target object are classified into the classes other than the first class.

For example, the processor may: obtain candidate bounding boxes for the candidate objects from the machine learning model; and determine, in the second determination, whether or not a likelihood of each of the candidate objects that have been determined as the non-first class, belonging to the other classes is higher than or equal to thresholds for the other classes associated with sizes of the candidate bounding boxes.

In this manner, the thresholds associated with the classes other than the first class are used in accordance with the sizes of the candidate bounding boxes output for the candidate objects. This improves the accuracy of detecting candidate objects within candidate bounding boxes in larger sizes, and reduces erroneous detection of candidate objects within candidate bounding boxes in smaller sizes.

An information processing method according to an aspect of the present disclosure is executed by a processor. The information processing method includes: obtaining an input image; inputting the input image to a machine learning model that executes classification likelihood calculation processing to obtain, for each of candidate objects in the input image, likelihoods of, belonging to a plurality of classes; executing first determination on whether or not each of the candidate objects is classified as a first class of the plurality of classes using a likelihood of belonging to the first class that is a likelihood having a negative correlation with likelihoods of belonging to other classes; executing second determination on whether or not each of the candidate objects that have been determined in the first determination as a non-first class is classified as the other classes; and outputting a result of classifying the candidate objects included in the input image using a result of the second determination.

In this manner, the first determination is executed using the likelihoods of the candidate objects belonging to the first class, the likelihoods having the negative correlation with the likelihoods of belonging to the other classes. The candidate bounding boxes are thus accurately classified into the first class or the non-first class. Only the candidate objects determined as the non-first class are subjected to the second determination on whether or not these candidate objects are classified as the classes other than the first class. Accordingly, the information processing method according to the aspect of the present disclosure reduces the amount of determination processing.

An aspect of the present disclosure may provide a program for causing a computer to execute the information processing method. Alternatively, an aspect provides a non-transitory computer-readable recording medium that stores the program.

Now, the embodiment will be described in detail with reference to the drawings.

Note that the embodiment described below is a general or specific example of the present disclosure. The numerical values, shapes, materials, constituent elements, the arrangement and connection of the constituent elements, steps, step orders etc. shown in the following embodiment are thus mere examples, and are not intended to limit the scope of the present disclosure. Among the constituent elements in the following embodiment, those not recited in any of the independent claims defining the broadest concept of the present disclosure are described as optional constituent elements.

The figures are schematic representations and not necessarily drawn strictly to scale. The scales are thus not necessarily the same in the figures. In the figures, substantially the same constituent elements are assigned with the same reference marks, and redundant descriptions will be omitted or simplified.

In this specification, the terms, such as "horizontal" or "vertical", representing the relationships between elements and numerical value ranges include not only the strict sense but also substantially equivalent ranges, for example, differences of about several percent.

Embodiment

1. Outline

First, the outline of an information processing device according to the embodiment will be described. The information processing device is for detecting objects in an image. For example, the information processing device may be a component of a camera system mounted in a vehicle such as a motor vehicle, a motorcycle, a bicycle, and a train, a flying object such as a drone, or a moving object such as an airplane, or a component of a security camera system.

The information processing device outputs a result of classifying objects in an image using a trained machine learning model. The machine learning model is, for example, a convolution filtering network (CNN) and is trained using training data. An operation of the information processing device and the training of the machine learning model will be described later.

2. Functional Configuration

Figure 4:
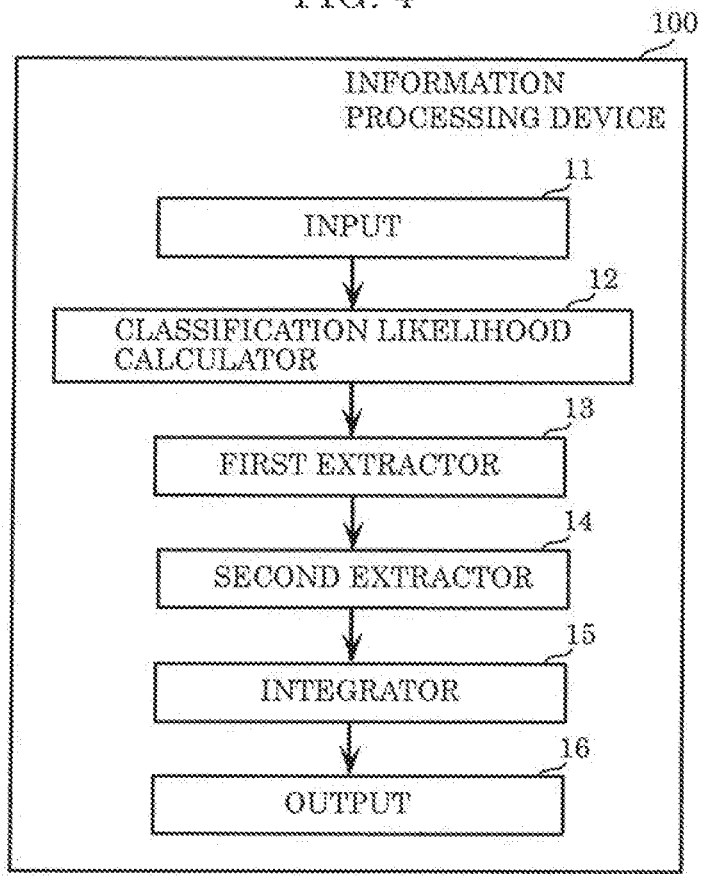
FIG. 4 is a block diagram showing an example functional configuration of an information processing device according to an embodiment.

An example functional configuration of the information processing device will be described with reference to FIG. 4. FIG. 4 is a block diagram showing an example functional configuration of information processing device 100 according to the embodiment.

As shown in FIG. 4, information processing device 100 obtains an input image and inputs the input image to input 11. Input 11 outputs the input image to classification likelihood calculator 12. Classification likelihood calculator 12 is, for example, a machine learning model that executes calculation processing of classification likelihood. Classification likelihood calculator 12 calculates the likelihoods of the candidate objects in the input image belonging to a plurality of classes. More specifically, as described with reference to (d) of FIG. 1, classification likelihood calculator 12 convolutes the input image through convolution filter processing and extracts feature maps in various sizes. Classification likelihood calculator 12 calculates then the likelihoods of the candidate bounding boxes, which have been assigned to feature points on the feature maps, belonging to the classes. That is, classification likelihood calculator 12 performs detection processing of all the candidate bounding boxes shown in (d) of FIG. 1.

First extractor 13 extracts candidate objects (hereinafter referred to as "candidate bounding boxes") classified as a first class of the plurality of classes, and outputs the candidate bounding boxes classified as the classes other than the first class (hereinafter referred to as "the other classes") to second extractor 14. Second extractor 14 classifies the candidate bounding boxes classified as the non-first class into associated classes, and outputs the result to integrator 15. That is, the processing performed by first extractor 13 and second extractor 14 corresponds to the first processing of the non-maximum suppression (NMS) processing described with reference to (d) of FIG. 1. After that, integrator 15 obtains the plurality of candidate bounding boxes output from second extractor 14 and classified as the non-first class, and executes the second processing of the NMS processing of the obtained candidate bounding boxes. Integrator 15 deletes one(s) of the overlapping candidate bounding boxes other than the one with the maximum likelihood to integrate the candidate bounding boxes into the one. Output 16 outputs the integrated candidate bounding box as the final result of detection.

3. Example Installation

Figure 5:
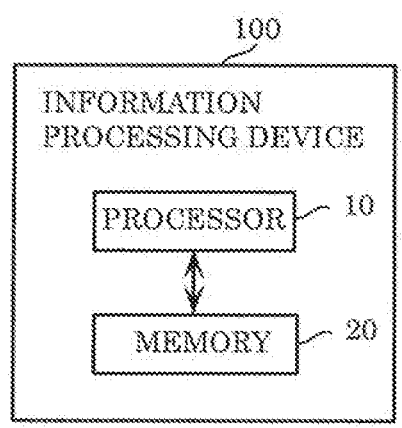
FIG. 5 is a block diagram showing example installation of the information processing device according to the embodiment.

Now, example installation of information processing device 100 will be described. FIG. 5 is a block diagram showing example installation of information processing device 100 according to the embodiment. Information processing device 100 includes processor 10 and memory 20. For example, processor 10 and memory 20 shown in FIG. 5 serve as the constituent elements of information processing device 100 shown in FIG. 4.

Processor 10 is an electronic circuit accessible to memory 20 and performs information processing. For example, processor 10 is a dedicated or general-purpose processor that detects objects in an image using memory 20. Processor 10 may be, for example, a CPU.

For example, processor 10 may be dedicated hardware that reads and executes software programs stored in memory 20. The software programs may be distributed through download or after storing in a storage medium such as a semiconductor memory.

Processor 10 may include a plurality of electronic circuits or a plurality of sub-processors. Alternatively, processor 10 may serve as the constituent elements of information processing device 100 shown in FIGS. 4 and 5 other than those for storing information.

Memory 20 is a dedicated or general-purpose memory that stores information required by processor 10 detecting objects in an image. Memory 20 may be an electronic circuit connected to processor 10 or included in processor 10.

Memory 20 may include a plurality of electronic circuits or a plurality of sub-memories. Memory 20 may be a magnetic disk or an optical disk, for example, and may also be expressed as a "storage" or a "recoding medium", for example. In addition, memory 20 may be a non-volatile memory or a volatile memory.

For example, memory 20 may serve as the constituent elements of information processing device 100 shown in FIGS. 4 and 5 for storing information.

Memory 20 may store moving images provided for object detection processing or bit strings associated with moving images provided for object detection processing. Memory 20 stores programs required by processor 10 detecting objects in an image.

Information processing device 100 may not include all the constituent elements shown in FIGS. 4 and 5, and may not perform all the processing described above. Some of the constituent elements shown in FIGS. 4 and 5 may be included in another device, and some of the processing may be executed by another device. Accordingly, information processing device 100 includes some of constituent elements shown in FIGS. 4 and 5, and performs some of the processing described above. This reduces the amount of determination processing at the final stage.

As described above, processor 10 of information processing device 100 shown in FIG. 5 detects objects in an image using memory 20 of information processing device 100.

For example, processor 10 obtains an input image, and inputs the input image to a machine learning model that executes classification likelihood calculation processing to obtain the likelihoods of each candidate object (hereinafter referred to as a "candidate bounding box") in the input image belonging to a plurality of classes. Processor 10 executes then first determination on whether or not each of the candidate bounding boxes is classified as a first class of the plurality of classes using the likelihood of belonging to the first class that is a likelihood having a negative correlation with the likelihoods of belonging to the other classes. More specifically, processor 10 determines, in the first determination, whether or not the likelihood of each of the candidate bounding boxes belonging to the first class is higher than or equal to a first threshold.

In the "negative correlation" described above, the likelihood of belonging to the first class and the likelihoods of belonging to the other classes cannot be high at the same time. The expression "cannot be high" means that the likelihood cannot be higher than or equal to the threshold. Accordingly, the likelihoods of the candidate bounding boxes belonging to the first class and the likelihoods of belonging to the other classes cannot be high at the same time. More specifically, if the likelihood of each of the candidate bounding boxes belonging to the first class is higher than or equal to the threshold, the likelihoods of belonging to the other classes are lower than the threshold. Therefore, processor 10 performs classification processing using the likelihoods of the candidate bounding boxes belonging to the first class, the likelihood having a negative correlation with the likelihoods of belonging to the other classes. Accordingly, the candidate bounding boxes are accurately classified into the first class or the non-first class.

Note that the first class may appear more frequently in an image than the classes other than the first class. The expression "appear more frequently in an image" means, for example, that the class is detected more in an image or a larger number of all candidate bounding boxes in an image have the likelihood of belonging to the class that is higher than a threshold.

For example, processor 10 further executes third determination on whether or not the candidate bounding boxes are classified as another class. The processor determines, as the first threshold, a value higher than the likelihoods of the candidate bounding boxes, which have been determined in the third determination as this class, belonging to the first class. For example, processor 10 executes the third determination on the candidate objects in a plurality of input images. The processor determines, as the first threshold, a value higher than all the likelihoods of the candidate objects in the input images, which have been determined in the third determination as this class, belonging to the first class. Here, whether or not the likelihood of each of the candidate bounding boxes belonging to the first class is higher than or equal to the first threshold is determined in the first determination. All the candidate bounding boxes determined in the third determination as the other classes are classified as the non-first class. This reduces erroneous classification of the candidate bounding boxes to be classified as the other classes as the first class.

For example, the first class is a background class. In this case, processor 10 classifies the candidate bounding boxes into the background class and the non-background class. This extracts candidate bounding boxes highly likely to include a detection target object from all the candidate bounding boxes. There is thus no need to execute further classification processing of the candidate bounding boxes including no detection target object, and thus reduces the amount of classification processing. In addition, processing is executed to classify those of all the candidate bounding boxes highly likely to include an object into the classes other than the background. This improves the efficiency of the classification processing.

For example, processor 10 executes second determination on whether or not the candidate bounding boxes, which have been determined in the first determination as the non-first class, are classified as the other classes. Here, assume that the first class, out of the plurality of classes, appears most frequently in an image. In this case, the number of the candidate bounding boxes determined as the first class is larger than the number of the candidate bounding boxes classified as the non-first class. Only the candidate bounding boxes determined as the non-first class are subjected to the second determination, which largely reduces the amount of processing as compared to the case where all the candidate bounding boxes are subjected to the second determination.

After that, processor 10 outputs a result of classifying objects included in an input image using the first determination and the second determination. This allows simple and rapid output of the result of classifying the objects included in the input image.

The following program is the software that achieves information processing device 100 according to this embodiment.

Specifically, this program causes a computer to implement an information processing method. The method includes obtaining an input image, and inputting the input image to a machine learning model that executes classification likelihood calculation processing to obtain likelihoods of each of candidate objects in the image belonging to a plurality of classes. The method further includes executing first determination on whether or not each of the candidate bounding boxes is classified as a first class of the plurality of classes using the likelihood of belonging to the first class that is a likelihood having a negative correlation with the likelihoods of belonging to the other classes. The method further includes executing second determination on whether or not the candidate objects, which have been determined in the first determination as the non-first class, are classified as the other classes. The method includes outputting a result of classifying the objects included in the input image using a result of the second determination.

4. Operation
4-1. Classification Processing of Candidate Bounding Boxes

Figure 6:
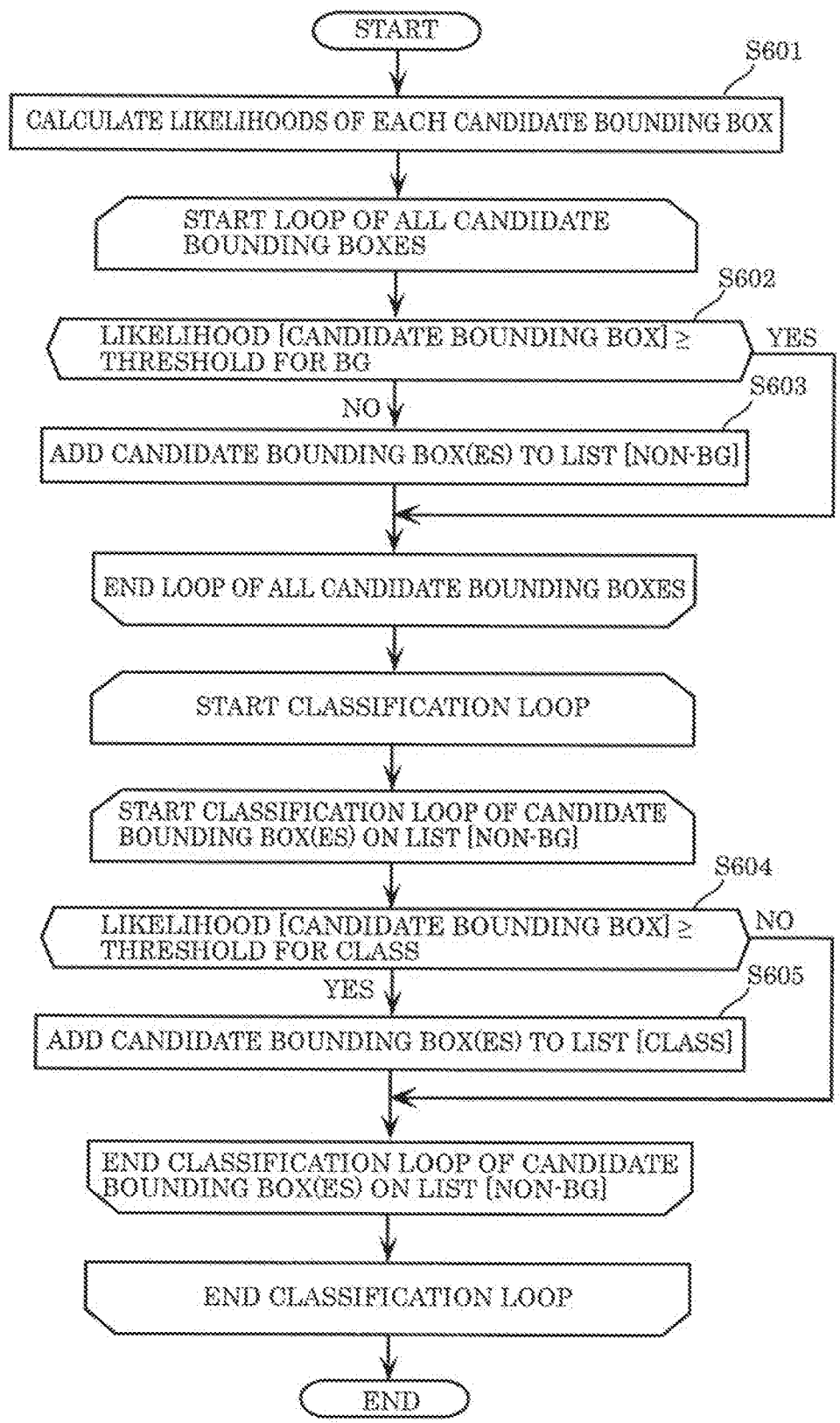
FIG. 6 is a flow chart showing an example operation of the information processing device according to the embodiment.

Now, an operation of information processing device 100 will be described. FIG. 6 is a flow chart showing an example operation of information processing device 100 according to the embodiment.

First, information processing device 100 obtains an input image (not shown). As shown in FIG. 6, information processing device 100 then calculates the likelihoods of candidate bounding boxes in the input image (step S601). More specifically, information processing device 100 inputs the input image to a machine learning model that executes classification likelihood calculation processing to cause the machine learning model to calculate the likelihoods of the candidate bounding boxes in the input image belonging to a plurality of classes.

Information processing device 100 executes first determination on whether or not all the candidate bounding boxes are classified as a first class of the plurality of classes using the likelihood of belonging to the first class that is a likelihood having a negative correlation with the likelihoods of belonging to the other classes. The definition of the "first class" has been described above in terms of the example installation, and repetitive description will thus be omitted. An example will be described where the first class is a background (BG) class.

Information processing device 100 determines whether or not the likelihood of each candidate bounding box belonging to the background class is higher than or equal to the threshold for the "background" (step S602). If the likelihood of a certain candidate bounding box belonging to the background class is higher than or equal to the threshold for the "background" (Yes in step S602), the certain candidate bounding box is added to the list of the background (BG) class. On the other hand, if the likelihood of the certain candidate bounding box belonging to the background class is lower than the threshold for the "background" (No in step S602), the certain candidate bounding box is added to the list of the non-background (non-BG) class (step 3603). Information processing device 100 executes the processing loop of all the candidate bounding boxes to classify all the candidate bounding boxes into the two classes, that is, the background (BG) class or the non-background (non-BG) class.

Information processing device 100 executes then second determination (step S604) on whether or not the candidate bounding boxes determined in the first determination (step S602) as the non-background class (i.e., the candidate bounding box added to the list of the non-background class) are classified as another class. Specifically, the device determines whether or not the likelihood of each of these candidate bounding boxes belonging to this class is higher than or equal to the threshold for the class (step 604). If the likelihood of a certain candidate bounding box belonging to a certain class (e.g., the likelihood of belonging to a motor vehicle class) is higher than or equal to the threshold for the "motor vehicle" (Yes in step S604), the certain candidate bounding box is added to the list of the motor vehicle class (step S605). On the other hand, if the likelihood of the certain candidate bounding box belonging to the motor vehicle class is lower than the threshold for the "motor vehicle" (No in step S604), the certain candidate bounding box is not added to the list of the motor vehicle class.

In information processing device 100, for example, if the likelihood of another candidate bounding box belonging to the motor vehicle class is higher than or equal to the threshold for the "motor vehicle" (Yes in step S604), this candidate bounding box is added to the list of the motor vehicle class (step S605). On the other hand, if the likelihood of this candidate bounding box belonging to the motor vehicle class is lower than the threshold for the motor vehicle class (No in step S604), this candidate bounding box is not added to the list of the motor vehicle class.

In this manner, the classification processing is executed to determine whether or not all the candidate bounding boxes in the list of the non-background class are classified as another class (the motor vehicle class here). After that, classification processing is executed to determine whether or not the remaining candidate bounding boxes are classified as further another class (e.g., a pedestrian class). After repeating similar processing, a classification loop of all the candidate bounding boxes in the list of the non-background class ends.

As described above, information processing device 100 according to this embodiment determines first, whether or not all candidate bounding boxes in an input image are classified as a class, for example, most likely to appear in the image (i.e., the class with the likelihood having a negative correlation with the likelihoods of belonging to other classes). As a result, for example, all the detected candidate bounding boxes are classified into the two of the background class and the non-background class. The background class is, for example, the class most likely to appear in the image. Information processing device 100 performs classification processing of the candidate bounding boxes classified as the non-background class into the classes other than the background class. This reduces the amount of processing.

4-2. Determination Processing on First Threshold for First Class

Figure 7:
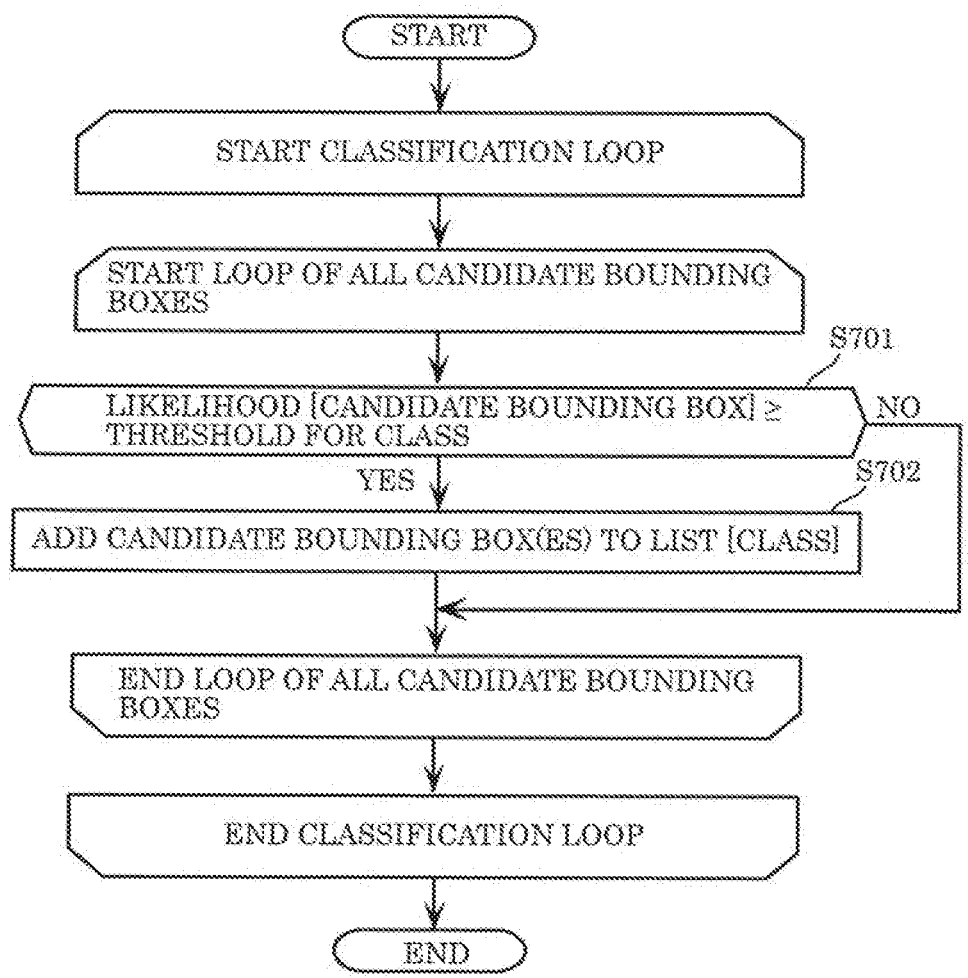
FIG. 7 is a flow chart showing example offline processing of a machine learning model.

Now, an example flow of determination processing on a first threshold that is a likelihood threshold for the first class (the background class here) executed by information processing device 100 will be described. FIG. 7 is a flow chart showing example offline processing of the machine learning model according to the embodiment.

As described with reference to FIG. 6, information processing device 100 inputs the input image to the machine learning model that executes the classification likelihood calculation processing to calculate the likelihoods of the candidate bounding boxes in the input image belonging to the plurality of classes. The machine learning model has trained to detect the candidate bounding boxes in the input image and calculate the likelihoods of the candidate bounding boxes belonging to the plurality of classes using training data.

Information processing device 100 inputs a predetermined input image, for example, offline to the machine learning model. The machine learning model calculates the likelihoods of all the detected candidate bounding boxes belonging to the plurality of classes (not shown).

Information processing device 100 causes then the machine learning model to start the classification loop. First, information processing device 100 causes the machine learning model to execute classification processing of all the candidate bounding boxes to determine whether or not the candidate bounding boxes are classified as one of the plurality of classes. For example, the machine learning model determines whether or not the likelihood of a certain candidate bounding box belonging to the background class is higher than or equal to the threshold for the "background" (step S701). If the likelihood of the certain candidate bounding boxes belonging to the background class is higher than or equal to the threshold for the "background" (Yes in step S701), the certain candidate bounding box is added to the list of the background class (step S702). On the other hand, if the likelihood of the certain candidate bounding box belonging to the background class is lower than the threshold for the "background" (No in step S701), the certain candidate bounding box is not added to the list of the background class.

The machine learning model executes then the processing in step S701 of another candidate bounding box. If the likelihood of this candidate bounding box belonging to the background class is higher than or equal to the threshold for the "background" (Yes in step S701), this candidate bounding box is added to the list of the background class (step S702). On the other hand, if the likelihood of this candidate bounding box belonging to the background class is lower than the threshold for the "background" (No in step S701), this candidate bounding box is not added to the list of the background class.

As described above, the classification processing is executed to determine whether or not all the candidate bounding boxes are classified as the background class. After that, the classification processing (the processing of second determination) is executed to determine whether or not all the candidate bounding boxes classified as the non-background class are classified into a class (e.g., the motor vehicle class) other than the background class. Similarly, after the end of the classification processing of all the candidate bounding boxes into the motor vehicle class or the non-motor vehicle class, classification processing is executed to determine whether or not all the candidate bounding boxes classified as the non-motor vehicle class are classified as a class (e.g., a pedestrian class) other than the background class and the motor vehicle class. In this manner, the classification processing is executed to classify all the candidate bounding boxes into the associated classes.

Although not shown, information processing device 100 determines, as the first threshold, a value greater than the likelihoods of the candidate bounding boxes, which have been added in the series of processing to the list of the classes other than the background class, belonging to the background class. For example, the first threshold may be greater than the mean value of the likelihoods of the candidate bounding boxes, which have been added to the list of the other classes, belonging to the background class or greater than the maximum value. Accordingly, information processing device 100 classifies the candidate bounding boxes, which are likely to include an object, as the non-background class in the first determination.

4-3. Adjustment of Determined First Threshold

Information processing device 100 executes then the first determination on all the candidate bounding boxes in an input image using the first threshold determined by the processing shown in FIG. 7. The device determines whether or not the first threshold is proper and adjusts the first threshold based on the result of determination.

Figure 8:
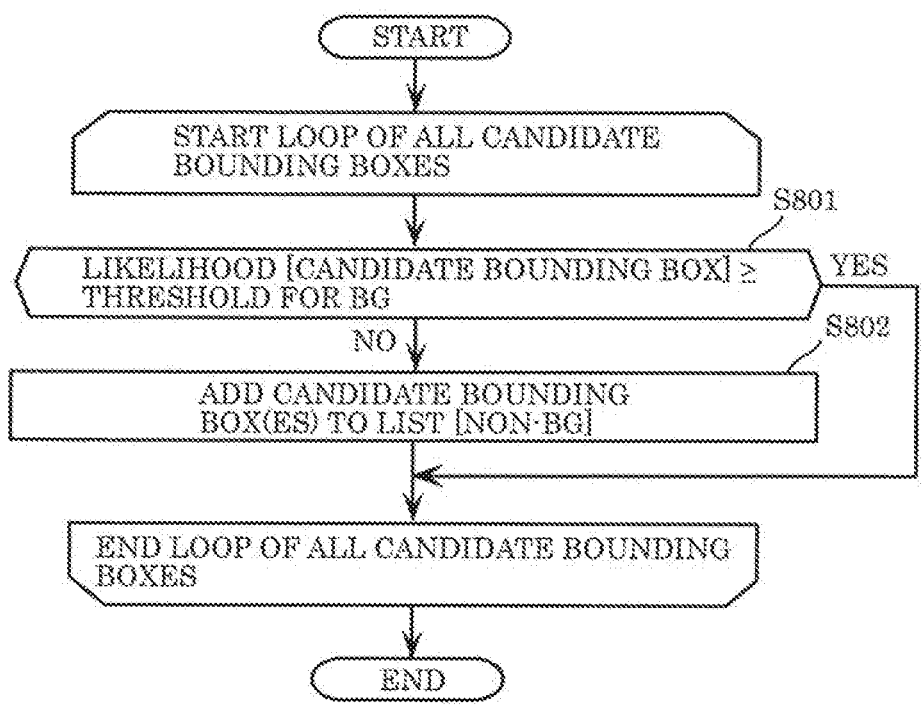
FIG. 8 is a flow chart showing another example offline processing of the machine learning model.

FIG. 8 is a flow chart showing another example offline processing of the machine learning model. In the processing flow shown in FIG. 8, information processing device 100 executes the first determination on whether or not the likelihoods of all the candidate bounding boxes, in an input image, belonging to the first class (e.g., the background class here) are higher than or equal to the first threshold. The device classifies all the candidate bounding boxes into the background class or the non-background class. The first threshold is the threshold for the first class (e.g., the background class here). In the processing flow shown in FIGS. 7 and 8, information processing device 100 inputs the same input image to the machine learning model.

As shown in FIG. 8, information processing device 100 causes the machine learning model to determine whether or not all the candidate bounding boxes are classified as the background class. For example, the machine learning model determines whether or not the likelihood of a certain candidate bounding boxes belonging to the background class is higher than or equal to the threshold for the "background" (step S801). If the likelihood of the certain candidate bounding boxes belonging to the background class is higher than or equal to the threshold for the "background" (Yes in step S801), the certain candidate bounding box is added to the background class. On the other hand, if the likelihood of the certain candidate bounding box belonging to the background class is lower than the threshold for the "background" (No in step S801), the certain candidate bounding box is added to the non-background (non-BG) class (step S802).

Information processing device 100 executes similar processing to classify the other candidate bounding boxes into the background list or the non-background list. With the end of executing the first determination on all the candidate bounding boxes, the loop of all the candidate bounding boxes ends.

Information processing device 100 determines whether or not all the candidate bounding boxes classified in the processing flow shown in FIG. 7 as the classes other than the background class have been added in the processing shown in FIG. 8 to the list of the non-background class. Assume that all the candidate bounding boxes classified as the other classes have been added to the list of the non-background class. In this case, information processing device 100 may add a predetermined margin to the first threshold in accordance with the difference between the number of the candidate bounding boxes, which have been added to the list of the non-background class, and the number of the candidate bounding box, which have boon classified as the other classes. On the other hand, if there is any one(s) of the candidate bounding boxes determined as the other classes but not added to the list of the non-background class, information processing device 100 adjusts the first threshold. At this time, information processing device 100 may adjust the first threshold based on data on the one(s) of the candidate bounding boxes determined as the other classes but not added to the list of the non-background class.

Adjusting the first threshold, information processing device 100 executes the processing flow shown in FIG. 8 using the adjusted first threshold. Information processing device 100 determines again whether or not all the candidate bounding boxes classified in the processing flow shown in FIG. 7 as the other classes are included in the list of the non-background class. In this manner, information processing device 100 executes offline training of the machine learning model using data for predetermined training to determine the proper first threshold.

Variation

Now, an information processing device according to a variation will be described. Differences from information processing device 100 according to the embodiment will be mainly described here.

The information processing device according to the variation determines the thresholds associated to the other classes in accordance with the sizes of the candidate bounding boxes determined in the first determination as the non-first class (e.g., non-background class). The device determines whether or not the likelihoods of each the candidate bounding boxes belonging to the other classes are higher than or equal to the threshold. In this respect, this device is different from information processing device 100 according to the embodiment.

Figure 9:
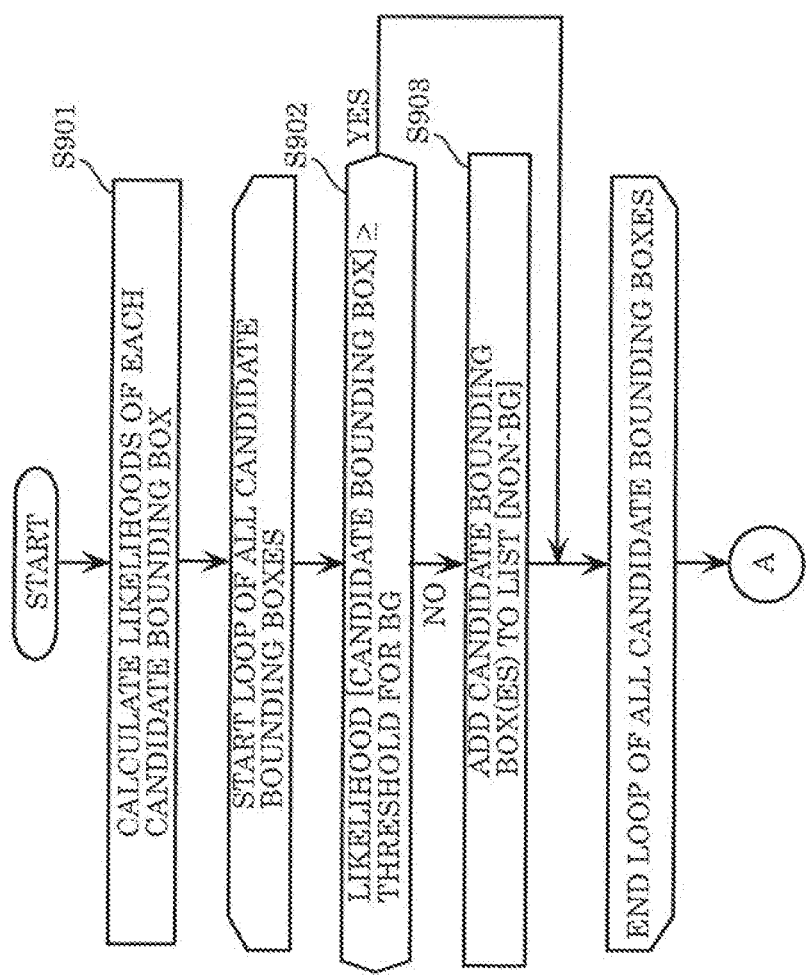
FIG. 9 is a first flow chart showing an example operation of an information processing device according to a variation of the embodiment.
Figure 10:
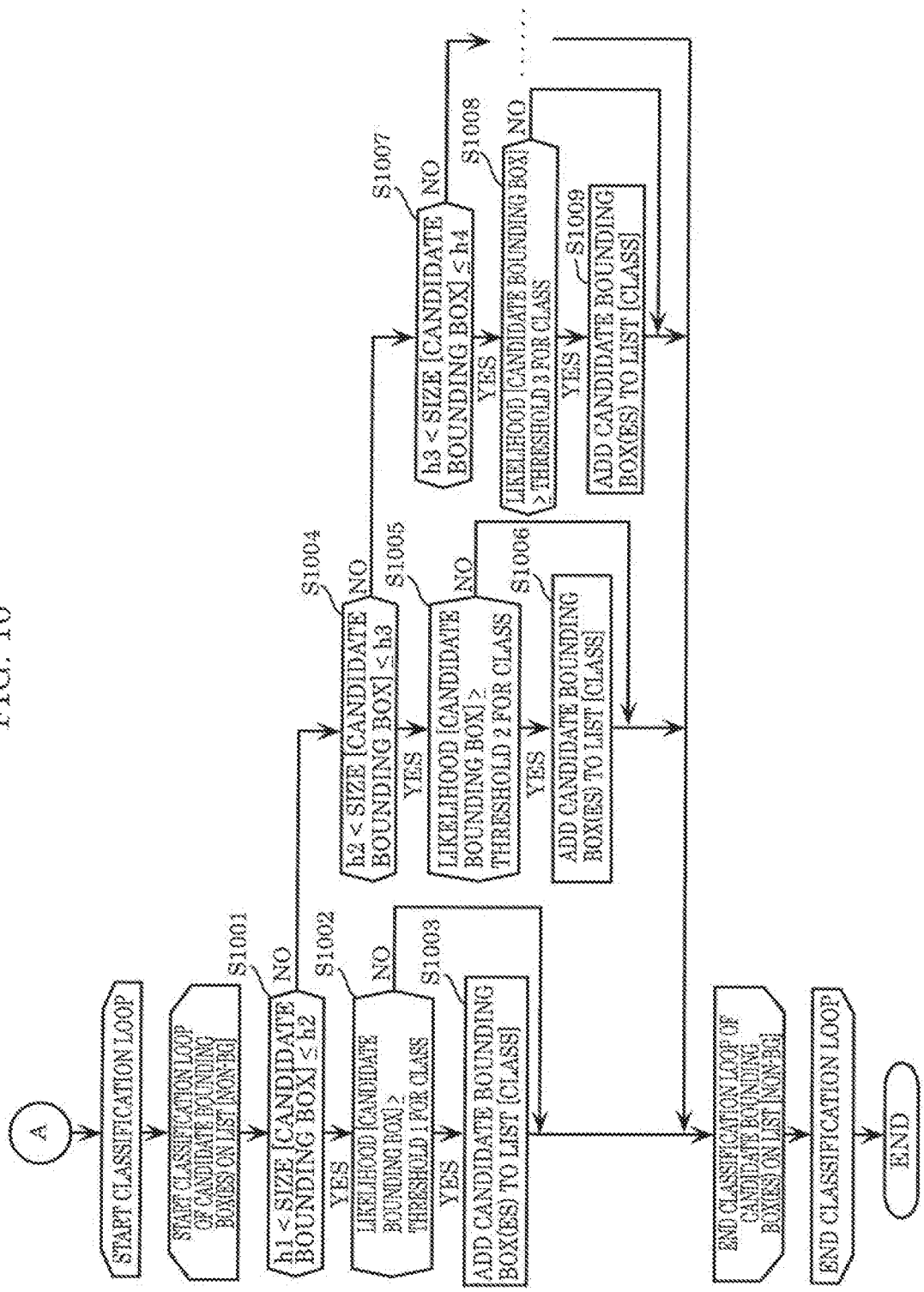
FIG. 10 is a second flow chart showing the example operation of the information processing device according to the variation of the embodiment.

FIG. 9 is a first flow chart showing an example operation of an information processing device according to a variation. FIG. 10 is a second flow chart showing the example operation of the information processing device according to the variation.

As shown in FIG. 9, the information processing device according to a variation calculates the likelihoods of the candidate bounding boxes in the input image belonging to a plurality of classes (step S901). The information processing device executes then first determination on all the candidate bounding boxes. For example, the information processing device executes the first determination on whether or not the likelihood of a certain candidate bounding box belonging to the "background" is higher than or equal to the threshold for the "background" (step S902). If the likelihood of the certain candidate bounding box belonging to the "background" is higher than or equal to the threshold for the "background" (Yes in step S902), the certain candidate bounding box is added to the list of the background class. On the other hand, if the likelihood of the certain candidate bounding box belonging to the "background" is lower than the threshold for the "background" (No in step S902), the certain candidate bounding box is added to the list of the non-background (non-BG) (step S903).

The first determination is then executed on whether or not the likelihood of another candidate bounding box belonging to the "background" is higher than or equal to the threshold for the "background" (step S902). If the likelihood of this candidate bounding box belonging to the background is higher than or equal to the threshold for the "background" (Yes in step S902), this candidate bounding box is added to the list of the background class. On the other hand, if the likelihood of this candidate bounding box belonging to the "background" is lower than the threshold for the "background" (No in step S902), this candidate bounding box is added to the list of the non-background (non-BG) class (step S903).

After the end of the processing loop of all the candidate bounding boxes, the processing of a classification loop of the candidate bounding boxes in the list of the non-background class starts (see FIG. 10).

Although not shown, the information processing device according to the variation determines the thresholds associated to the other classes in accordance with the sizes of the candidate bounding boxes. For example, the smaller the candidate bounding boxes are, the smaller thresholds are set. This reduces erroneous detection of smaller objects included in a video by the information processing device.

As shown in FIG. 10, first, the information processing device determines the sizes of the candidate bounding boxes. For example, the information processing device determines whether or not the sizes of the candidate bounding boxes added by the processing shown in FIG. 9 to the list of the non-background class larger than height 1 (h1) and smaller than or equal to height 2 (h2) (step S1001). At this time, if the size of a first candidate bounding box is larger than h1 and smaller than or equal to h2 (Yes in step S1001), whether or not the likelihood of the first candidate bounding box belonging to the motor vehicle class is higher than or equal to threshold 1 for the motor vehicle is determined (step S1002). If the likelihood of the first candidate bounding box belonging to the motor vehicle class is higher than or equal to the threshold for the "motor vehicle", the certain candidate bounding box is added to the list of the motor vehicle class (step S1003). On the other hand, if the likelihood of the first candidate bounding box belonging to the motor vehicle class is lower than the threshold for the "motor vehicle" (No in step S1002), the first candidate bounding box is not added to the list of the motor vehicle class.

Next, whether or not the size of a second candidate bounding box is larger than h1 and smaller than or equal to h2 is determined (step S1001). If the size of the second candidate bounding box is not larger than h1 or not smaller than or equal to h2 (No in step S1001), whether or not the size of the second candidate bounding box is larger than height 2 (h2) and smaller than or equal to height 3 (h3) is determined (step S1004). At this time, if the size of the second candidate bounding box is larger h2 and smaller or equal to h3 (Yes in step S1004), whether or not the likelihood of the second candidate bounding box belonging to the motor vehicle class is higher than or equal to threshold 2 for the motor vehicle is determined (step S1005). If the likelihood of the second candidate bounding box belonging to the motor vehicle class is higher than or equal to threshold 2 for the motor vehicle (Yes in step S1005), the second candidate bounding box is added to the list of the motor vehicle class (step S1006). On the other hand, if the likelihood of the second candidate bounding box belonging to the motor vehicle class is smaller than threshold 2 for the motor vehicle (No in step S1005), the second candidate bounding box is not added to the list of the motor vehicle class.

After that, whether or not the size of a third candidate bounding box is larger than h1 and smaller than or equal to h2 is determined (step S1001). If the size of the third candidate bounding box is not larger than h1 or not smaller than or equal to h2 (No in step S1001), whether or not the size of the third candidate bounding box is larger than height 2 (h2) and smaller than or equal to height 3 (h3) is determined (step S1004). At this time, if the size of the third candidate bounding box is not larger than h2 or not smaller than or equal to h3 (No in step S1004), whether or not the size of the third candidate bounding box is larger than height 3 (h3) and smaller than or equal to height 4 (h4) is determined (step S1007). At this time, if the size of the third candidate bounding box is larger than h3 and smaller than or equal to h4 (Yes in step S1007), whether or not the likelihood of the third candidate bounding box belonging to the motor vehicle class is higher than or equal to a threshold 3 for the motor vehicle is determined (step S1008). If the likelihood of the third candidate bounding box belonging to the motor vehicle class is higher than or equal to the threshold 3 for the motor vehicle (Yes in step S1008), the third candidate bounding box is added to the list of the motor vehicle class (step S1009). On the other hand, if the likelihood of the third candidate bounding box belonging to the motor vehicle class is lower than the threshold 3 for the motor vehicle (No in step S1008), the third candidate bounding box is not added to the list of the motor vehicle class.

In this manner, after the end of the determination processing of the likelihoods of all the candidate bounding boxes, which have been classified as the non-background class, belonging to the motor vehicle with respect to the threshold, the classification processing of the classes other than the background class and the motor vehicle class is executed.

Other Embodiments

The information processing device and the information processing method according to one or more aspect have been described based on the embodiment. The present disclosure is not limited to the embodiment. The present disclosure includes other embodiments, such as those obtained by variously modifying the embodiment as conceived by those skilled in the art or those achieved by freely combining the constituent elements and functions in the embodiment without departing from the scope and spirit of the present disclosure.

For example, the processing described above in the embodiment may be implemented by centralized processing using a single device (or system) or decentralized processing using a plurality of devices. The program may be executed by a single processor or a plurality of processors, that is, centralized processing or decentralized processing.

The general and specific aspects of the present disclosure may be implemented in any combination of systems, methods, integrated circuits, computer programs, or recording media.

Various modifications, substitutions, additions, and omissions may be made to the embodiment within the scope of the claims or a scope equivalent thereto.

INDUSTRIAL APPLICABILITY

The present disclosure is useful, for example, as an information processing device capable of reducing the amount of classification processing, and is applicable to, for example, control of autonomous driving or detection of a person using a security camera system.

What is claimed is:

1. An information processing device, comprising:
a processor, wherein
the processor:
obtains an input image;
inputs the input image to a machine learning model that executes classification likelihood calculation processing to obtain, for each of candidate objects in the input image, likelihoods of belonging to a plurality of classes;
executes a first determination on whether or not each of the candidate objects is classified as a first class of the plurality of classes using a likelihood of belonging to the first class that is a likelihood having a negative correlation with likelihoods of belonging to other classes;
executes a second determination on whether or not each of the candidate objects that have been determined in the first determination as a non-first class is classified as the other classes; and
outputs a result of classifying the candidate objects included in the input image using a result of the second determination, wherein
the processor determines, in the first determination, whether or not the likelihood of each of the candidate objects belonging to the first class is higher than or equal to a first threshold, and
the processor:
determines the first threshold by training the machine learning model using data for predetermined training,
in the determination of the first threshold, executes a third determination on whether or not each of the candidate objects included in an input image of the data for predetermined training is classified as the other classes other than the first class; and
determines, as the first threshold, a value greater than a likelihood of each of the candidate objects, that have been determined in the third determination as the other classes, belonging to the first class.

2. The information processing device according to claim 1, wherein
the processor:
executes the third determination on candidate objects in a plurality of input images; and
determines, as the first threshold, a value greater than all likelihoods of the candidate objects in the plurality of input images, that have been determined in the third determination as the other classes, belonging to the first class.

3. The information processing device according to claim 1, wherein
the first class is a background class.

4. The information processing device according to claim 3, wherein
the processor:
obtains candidate bounding boxes for the candidate objects from the machine learning model;
determines a size of each of the candidate bounding boxes obtained; and
determines, in the second determination, whether or not a likelihood of each of the candidate objects, that have been determined as the non-first class, belonging to the other classes is higher than or equal to a second threshold among a plurality of thresholds for the other classes associated with sizes of the candidate bounding boxes,
each of the plurality of thresholds is associated with a size of each of the candidate bounding boxes, and
the second threshold is applied in accordance with the size determined for each of the candidate bounding boxes obtained.

5. An information processing method executed by a processor, the information processing method comprising:
obtaining an input image;
inputting the input image to a machine learning model that executes classification likelihood calculation processing to obtain likelihoods, for each of candidate objects in the input image, of belonging to a plurality of classes;
executing a first determination on whether or not each of the candidate objects is classified as a first class of the plurality of classes using a likelihood of belonging to the first class that is a likelihood having a negative correlation with likelihoods of belonging to other classes;
executing a second determination on whether or not each of the candidate objects that have been determined in the first determination as a non-first class is classified as the other classes; and
outputting a result of classifying the candidate objects included in the input image using a result of the second determination, wherein
in the first determination, whether or not the likelihood of each of the candidate objects belonging to the first class is higher than or equal to a first threshold, and
the first threshold is determined by training the machine learning model using data for predetermined training,
in the determination of the first threshold, a third determination is executed on whether or not each of the candidate objects included in an input image of the data for predetermined training is classified as the other classes other than the first class; and
it is determined that, as the first threshold, a value greater than a likelihood of each of the candidate objects, that have been determined in the third determination as the other classes, belonging to the first class.

6. A non-transitory computer-readable recording medium for use in a computer, the recording medium having a computer program recorded thereon for causing the computer to execute the information processing method according to claim 5.

7. An information processing device, comprising:
a processor, wherein
the processor:
   obtains an input image;
   inputs the input image to a machine learning model that executes classification likelihood calculation processing to obtain, for each of candidate objects in the input image, likelihoods of belonging to a plurality of classes;
   executes a first determination on whether or not each of the candidate objects is classified as a first class of the plurality of classes using a likelihood of belonging to the first class that is a likelihood having a negative correlation with likelihoods of belonging to other classes;
   executes a second determination on whether or not each of the candidate objects that have been determined in the first determination as a non-first class is classified as the other classes; and
   outputs a result of classifying the candidate objects included in the input image using a result of the second determination, wherein
the first class is a background class,
the processor:
   obtains candidate bounding boxes for the candidate objects from the machine learning model;
   determines a size of each of the candidate bounding boxes obtained; and
   determines, in the second determination, whether or not a likelihood of each of the candidate objects that have been determined as the non-first class, belonging to the other classes, is higher than or equal to a second threshold among a plurality of thresholds for the other classes associated with sizes of the candidate bounding boxes,
each of the plurality of thresholds is associated with a size of each of the candidate bounding boxes, and
the second threshold is applied in accordance with the size determined for each of the candidate bounding boxes obtained.

8. An information processing method executed by a processor, the information processing method comprising:
   obtaining an input image;
   inputting the input image to a machine learning model that executes classification likelihood calculation processing to obtain likelihoods, for each of candidate objects in the input image, of belonging to a plurality of classes;
   executing a first determination on whether or not each of the candidate objects is classified as a first class of the plurality of classes using a likelihood of belonging to the first class that is a likelihood having a negative correlation with likelihoods of belonging to other classes;
   executing a second determination on whether or not each of the candidate objects that have been determined in the first determination as a non-first class is classified as the other classes; and
   outputting a result of classifying the candidate objects included in the input image using a result of the second determination, wherein
the first class is a background class,
the processor:
   obtains candidate bounding boxes for the candidate objects from the machine learning model;
   determines a size of each of the candidate bounding boxes obtained; and
   determines, in the second determination, whether or not a likelihood of each of the candidate objects that have been determined as the non-first class, belonging to the other classes, is higher than or equal to a second threshold among a plurality of thresholds for the other classes associated with sizes of the candidate bounding boxes,
each of the plurality of thresholds is associated with a size of each of the candidate bounding boxes, and
the second threshold is applied in accordance with the size determined for each of the candidate bounding boxes obtained.

* * * * *